United States Patent [19]
Orr et al.

[11] B 3,913,985
[45] Oct. 21, 1975

[54] SEAL PROTECTION GUARD

[75] Inventors: Robert S. Orr, Pekin; Carl E. Fidler, Chillicothe, both of Ill.

[73] Assignee: Caterpillar Tractor Company, Peoria, Ill.

[22] Filed: Mar. 28, 1973

[21] Appl. No.: 345,567

[44] Published under the Trial Voluntary Protest Program on January 28, 1975 as document no. B 345,567.

[52] U.S. Cl. ................................ 305/11; 180/9.62
[51] Int. Cl.² ........................................ B62D 55/00
[58] Field of Search ............... 180/9.62; 305/11, 12

[56] References Cited
UNITED STATES PATENTS 2,702,603  2/1955  Risk .................................. 180/9.62
2,978,051  4/1961  Risk .................................. 180/9.62

*Primary Examiner*—Philip Goodman
*Attorney, Agent, or Firm*—Ralph E. Walters

[57] ABSTRACT

A seal protection guard for shielding an annular seal assembly disposed between two relatively rotary members which includes an annular barrier having a plurality of shielded openings so that tightly constrained packing of extraneous material around the seal assembly is minimized by permitting such material to be squeezed radially outwardly through the openings rather than against and into the seal assembly.

9 Claims, 3 Drawing Figures

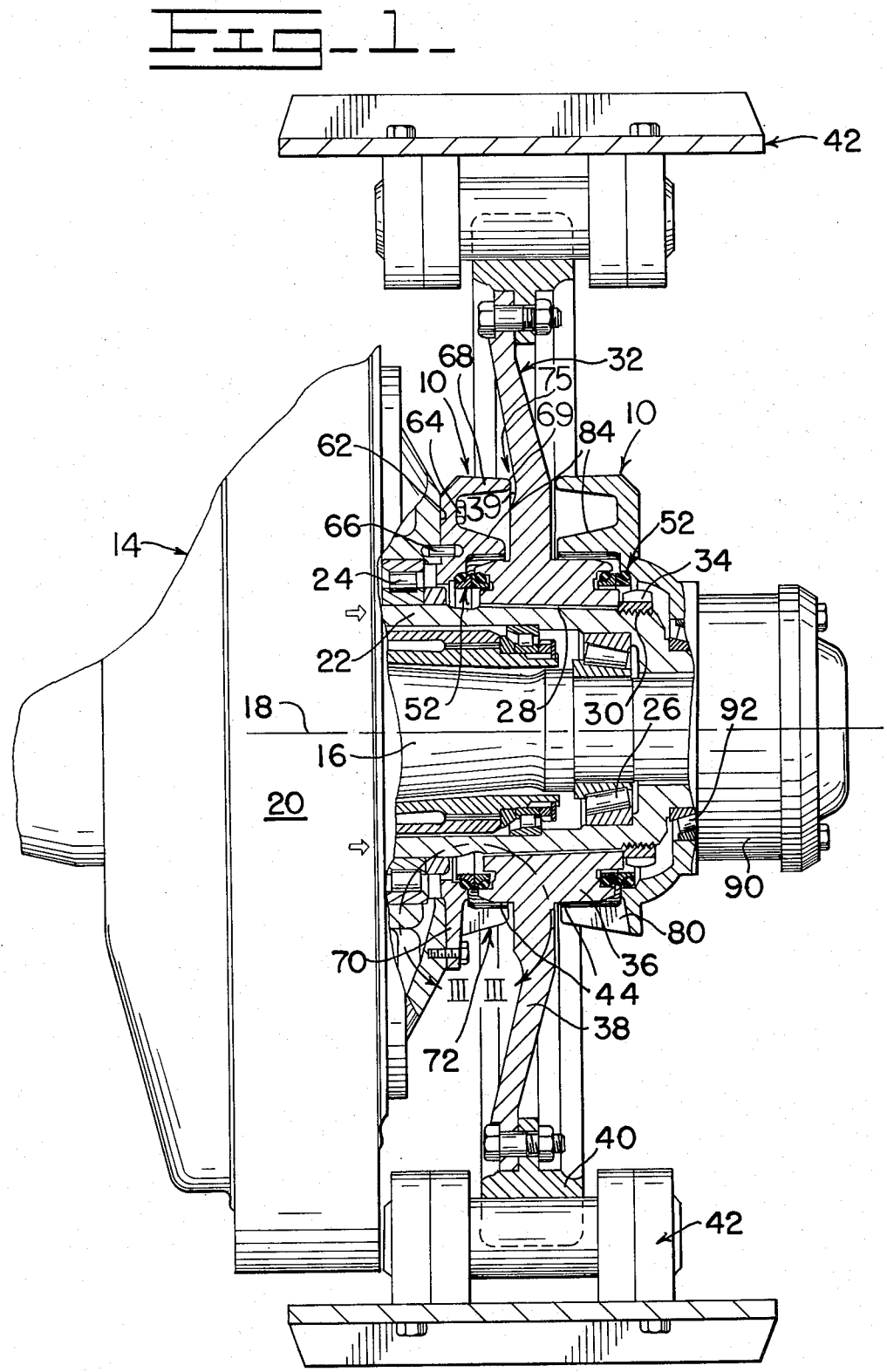

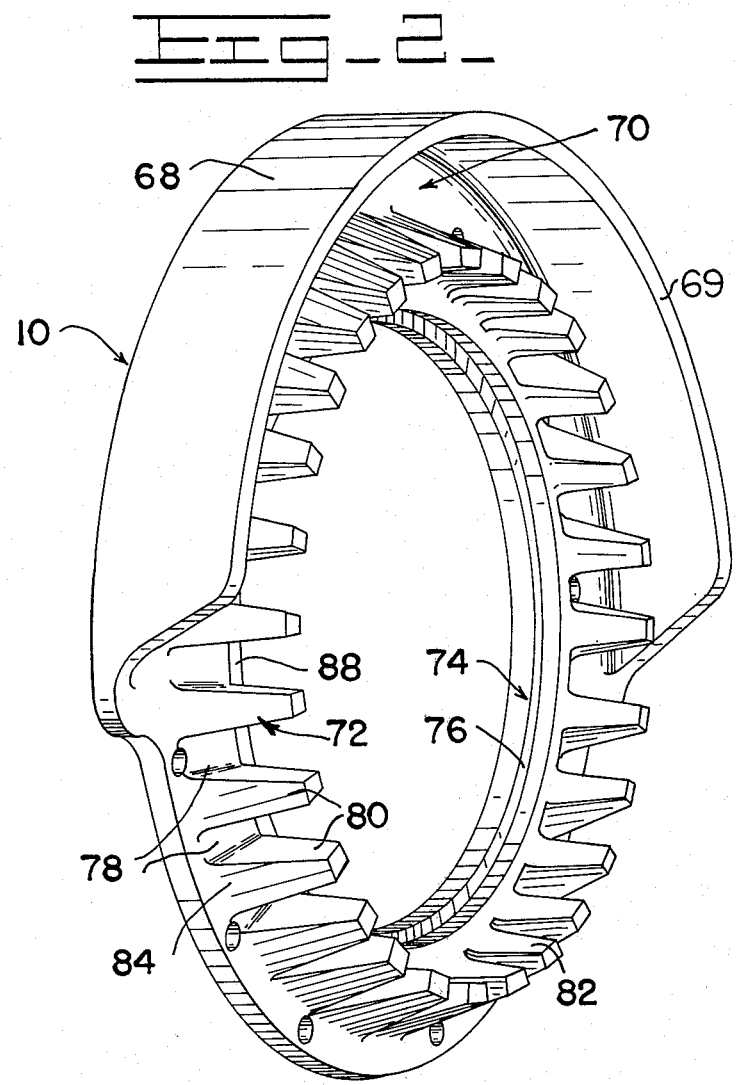
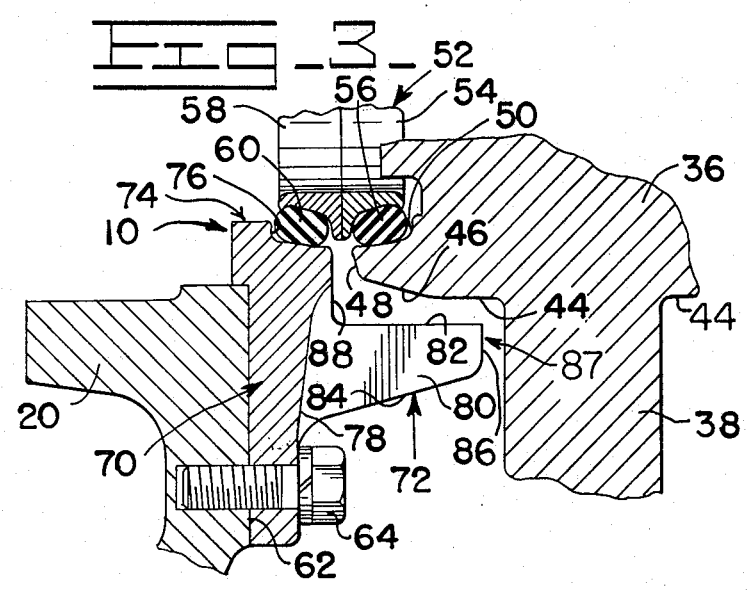

SEAL PROTECTION GUARD

BACKGROUND OF THE INVENTION

Vehicles which travel over rough terrain under adverse weather conditions have been traditionally plagued with seal leakage problems. Track-type vehicles incorporating undercarriages with a plurality of idler wheels and driving sprockets are particularly subjected to extremely harsh ground conditions including mud, ice, rocks, and other debris which manage to penetrate the annular recesses in the housings around the oil seals and cause them to leak. To reduce this problem, the industry has generally adapted overlapping shields which provide a torturous route for the material to penetrate inwardly toward the seals. Such overlapping shields provide a labyrinth path making it more difficult for the entry of foreign material and an example thereof is shown in the environment of the sprocket of a track-type tractor in U.S. Pat. No. 2,978,051, assigned to the assignee of the present invention.

While an overlapping shield arrangement does keep the larger particles and objects away from the periphery of such annular seals, finer particles of dirt and mud and ice still accumulate in the labyrinth passages and become firmly packed in place. Since these seals are normally disposed between relatively rotating members, a very close working clearance is established between the elements and packed debris so that with relatively limited axial or eccentric movement of the elements the packed and relatively entrapped material is pressurized so that a force is transmitted to the periphery of the seals. This force acts adversely on the seals and causes seal failure. Therefore, while conventional labyrinth shield arrangements are successful in part, they entrap material therewithin that can ultimately damage the seals.

SUMMARY AND OBJECTS OF THE INVENTION

Accordingly, it is an object of this invention to provide an improved seal protection guard for shielding an annular seal assembly disposed between two relatively rotating members for extending seal life under adverse conditions.

Another object of this invention is to provide such an improved seal protection guard that is capable of minimizing the transmittal of externally applied forces acting through deleterious material around the seal assembly.

Another object of this invention is to provide an improved seal protection guard of the character described which serves as a barrier to radially inwardly moving debris and is effective to divert its movement away from the periphery of the seal assembly should any material get past the barrier and packed around the seal assembly in order to minimize pressurization of such material by some externally applied force.

Other objects and advantages of the present invention will become more readily apparent upon reference to the accompanying drawings and following description.

BRIEF DESCRIPTION OF THE DRAWINGS

FIG. 1 is a central vertical sectional view through a final drive assembly of a track-type tractor embodying the seal protection guard of the present invention.

FIG. 2 is a three dimensional view of the seal protection guard of the present invention removed from the tractor.

FIG. 3 is an enlarged fragmentary section of the lower portion of the seal protection guard of the present invention taken from the area identified within the circular line III-III of FIG. 1.

Description of the Preferred Embodiment

Referring more particularly to the drawings, a seal protection guard, embodying the principles of the present invention is generally indicated by the reference numeral 10 and is shown in the environment of a final drive 14 of a track-type vehicle. The final drive includes a nonrotatable sprocket support shaft 16 having a central longitudinal axis 18 and which is secured in a cantilevered manner to a final drive housing 20. A powerably driven, quill shaft extension 22 is supported by a bearing 24 in the final drive housing, and by a bearing 26 on the sprocket support shaft for rotation about its longitudinal axis. The external periphery of the quill shaft extension is provided with a tapered spline portion 28 and a screw threaded portion 30 adapted respectively to receive a sprocket assembly 32 and a sprocket retaining nut 34 thereon. The sprocket assembly includes a hub 36 and an annular sprocket wall 38 extending generally centrally radially outwardly which has an annular recess 39 in faced relation to the final drive housing 20. The sprocket assembly further includes a removably secured outer sprocket tooth portion 40 which drivingly engages an endless track chain and ground engaging shoe assembly 42 for powerably moving the tractor in the usual manner.

As best shown in FIG. 1, the sprocket hub 36 has a pair of cylindrical ends 44 extending axially outwardly and inwardly of the sprocket wall 38. Each end of the hub also has a gradually tapering conical surface 46 and a relatively blunt conical end face 48 as best shown in the enlarged section of FIG. 3. An annular seal retainer surface 50 is formed in the hub axially inwardly of each of the end faces 48, and an annular seal assembly 52 is disposed in substantially radial alignment therewith for the containment of lubricant within the final drive 14 at each end of the sprocket hub.

Each of the annular seal assemblies 52 includes a rotary seal ring 54 which is resiliently mounted through an elastomeric O-ring 56 on the seal retaining surface 50 of the rotatable sprocket hub 36, and an opposing stationary seal ring 58 which is resiliently mounted through an elastomeric O-ring 60 on the final drive housing 20.

As best shown in FIG. 1, seal protection guard 10 of the present invention is removably secured to a substantially flat outer face 62 of the final drive housing 20 by a plurality of removable bolts 64 aligned by a plurality of dowels 66. As shown more clearly in FIGS. 2 and 3, the seal protection guard includes an upper semicylindrical or arcuate material deflecting shield 68 having an outer edge 69. The guard also includes an annular body portion 70, an annular barrier portion 72, and a radially inwardly disposed seal retainer portion 74. As shown in FIG. 1, the deflecting shield 68 is integrally associated with the annular body portion 70 of the seal protection guard and extends axially outwardly therefrom with the outer edge thereof extending into the annular recess 39 in the sprocket wall 38 and which provides a labyrinth path 75 that increases the difficulty of material penetrating radially inwardly toward the seal assembly 52. Similarly, the annular barrier portion 72 extends axially outwardly from the body portion 70 in circumscribingly shielding relation to the sprocket hub 36 and annular seal assembly 52 and in closely axially spaced relation with the sprocket wall. As shown in FIG. 3, the seal retainer portion 74 of the seal protection guard 10 includes an annular seal retainer surface 76 adapted to receive the O-ring 60 in seated relation thereon.

The annular barrier portion 72 of the seal protection guard 10 of the present invention includes a plurality of circumferentially spaced shielded openings or axially tapered endwardly opening slots 78 having a width of decreasing dimension inwardly toward the body portion 70. The slots form therebetween a plurality of axially extending, outwardly tapering teeth or projections 80 on the barrier portion of the guard. The teeth combine to form an interrupted cylindrical inner surface 82, a substantially frusto-conical external surface 84, and an outer end face 86. The interrupted end face of the teeth is disposed in a plane substantially perpendicular to the longitudinal axis 18 and is spaced a lesser distance axially outwardly from the annular body portion than the outer edge 69 of the shield 68 which extends into the sprocket recess 39. However, the interrupted end face of the teeth extends in closely axially spaced relation to the sprocket wall 38 to define a material pulverizing zone 87 therebetween. Radially inwardly of the teeth on the body portion is an inner radially extending face 88 disposed in closely axially spaced relation to the end face 48 of the sprocket hub 36.

In the representative environment of the final drive 14, the essential features in the seal protection guard 10 of the present invention are utilized, as previously described, on the inner side of the sprocket assembly 32 adjacent to the final drive housing 20. It will be appreciated that the accumulation of dirt and debris is more onerous on the inside of the sprocket assembly 32 than the outside thereof due to the increased entrapment effect of the final drive housing 20. However, substantially the same features are incorporated in a similar guard which is employed at the opposite outer side of the sprocket assembly to which reference numerals corresponding to similar portions of the previously described guard have been applied. Such similar guard only deviates from the previously described guard by being integrally formed with a track roller frame mounting hub 90 from which such frame has been removed in FIG. 1 for illustrative convenience. The hub is mounted on a bearing assembly 92 borne by the outer end of the quill shaft extension 22 so that the track roller frame and outer seal protection guard can rotate to a limited degree about the horizontal axis 18 as the vehicle encounters irregularities in terrain during earth traversing movement.

Operation

While the operation of the present invention is believed clearly apparent from the foregoing description, further amplification will subsequently be made in the following brief summary of such operation. During earth traversing movement of the tractor, the quill shaft extension 22 and the sprocket assembly 32 are rotated about the longitudinal horizontal axis 18 to drive the endless track chain and ground engaging shoe assembly 42 which picks up mud, rocks, and other debris over which the tractor is traveled. A substantial portion of this extraneous material descends by gravity onto the seal protection guards 10 of the subject invention. The semicylindrical shields 68 serve to deflect any relatively large objects away from the annular seal assemblies 52 and serve as an initial barrier to the movement of smaller particles therepast. Some smaller particles, however, may ultimately work themselves radially inwardly past the shields and the labyrinth path 75 toward the seal assemblies. Such particles must then pass by the annular barrier portions 72 which serve as a second impediment to the radially inward movement of extraneous material toward the seal assemblies. In so doing, a portion of these particles may initially contact the stationary frusto-conical external surfaces 84 of the tapered teeth 80 which provide ramps tending to move the particles toward the relatively rotating sprocket wall 38. The particles are thereby entrapped and fragmented therebetween in the material pulverizing zone 87 and diverted for discharge in a path arcuately downwardly around the sprocket hub 36 and out the relatively free exit beneath the guards.

Under extremely adverse conditions, relatively wet highly adhesive material still might accumulate around the peripheral surfaces between the sprocket hub 36 and the seal protection guards 10. Even though this material may dry out and harden, there is a tendency for the individual teeth 80 to vibrate with movement of the tractor, providing a self cleaning action. Further, in the event of extreme axial or radial loading on the sprocket assembly 32, it may be urged toward one of the seal protection guards in compressing relation to material disposed between the cylindrical inner surface 82 of the guard and the conical surface 46 and the conical end face 48 of the sprocket hub 36. However, rather than forcibly impinging against the seal assemblies, such material is diverted and squeezed outwardly through the openings 78 because of the radially outward thrust component contributed by the conical surface and conical end face.

In view of the foregoing, it is readily apparent that the seal protection guard of the subject invention provides an improved structure for shielding an annular seal assembly which is effective to substantially extend the operating life of such seal assembly under the most adverse conditions. This is accomplished by the toothed configuration of the guard which minimizes the packing of extraneous material around the seal assembly by continuous vibration of the teeth and by permitting any such material that happens to penetrate the guard to be diverted outwardly through the openings between the teeth. This positively insures that the material is rendered incapable of transmitting any externally applied forces therethrough into the seal assembly which normally with conventional guards is permitted to wedge the material so tightly around the seal assembly to cause certain failure requiring their frequent replacement.

While the invention has been described and shown with particular reference to the preferred embodiment, it will be apparent that variations might be possible that would fall within the scope of the present invention, which is not intended to be limited except as defined in the following claims.

What is claimed is:

1. A seal protection guard, for an annular seal assembly disposed between a pair of relatively rotatable members to minimize the entry of extraneous material into the seal assembly, comprising;

barrier means disposed in closely radially spaced relation to such a seal assembly and having a plurality of circumferentially spaced shielded openings formed therein to minimize tightly constrained packing of such material outwardly adjacent to the seal assembly by permitting the material to be squeezed substantially directly radially outwardly through the circumferentially spaced openings upon the imposition of an externally applied force tending to press such material into the seal assembly.

2. The seal protection guard of claim 1 wherein such a pair of relatively rotatable members includes a stationary member and a rotating member having a hub portion thereon, and the seal protection guard is removably secured to said stationary member so that said barrier means is disposed in axially overlapping relatively closely radially spaced relation to said hub portion of said rotating member permitting material to be squeezed radially outwardly through said plurality of shielded openings when said hub experiences relatively limited movement with respect to said barrier means.

3. A seal protection guard, for an annular seal assembly disposed between a pair of relatively rotatable members to minimize the entry of extraneous material into the seal assembly, comprising;

barrier means disposed in closely radially spaced relation to such a seal assembly and having a plurality of axially endwardly opening slots forming therebetween a plurality of substantially axially extending teeth to minimize tightly constrained packing of such material outwardly adjacent to the seal assembly by permitting the material to be squeezed radially outwardly through the slots upon the imposition of an externally applied force tending to press such material into the seal assembly.

4. The seal protection guard of claim 3 in which said barrier means comprises an annular body imposed in circumscribing relation to said annular seal assembly and semicylindrical deflector means disposed radially outwardly above said annular body for reducing the entry of extraneous material radially inwardly upon said teeth.

5. The seal protection guard of claim 4 in which said annular body is integrally formed with said deflector means and said teeth so that the teeth are readily excited by vibration accruing in said body to minimize accumulation of extraneous material in the slots between the teeth.

6. A seal protection guard, for shielding an annular seal assembly with a rotatable member having a hub supporting a portion of such a seal assembly, comprising;

an annular body disposed in substantially nonrotatable relatively closely axially spaced relation to said rotatable member and having an inner surface supporting another portion of the seal assembly in operative association with the portion thereof supported by said hub;

an annular barrier integrally formed in said annular body having a plurality of circumferentially spaced axially extending teeth defining openings therebetween disposed in radially spaced circumscribing relation to said seal assembly and in axially overlapping relatively closely radially spaced relation to said hub on the rotatable member; and an arcuate material deflecting shield integrally formed on said annular body in radially upwardly spaced relation to said annular barrier for initially deflecting larger particles of extraneous material away from the seal assembly while permitting substantially unrestricted discharge of material downwardly outwardly from the guard through said openings in the annular barrier.

7. The seal protection guard of claim 6 in which said teeth combine to afford in interrupted outer end face disposed in relatively closely axially spaced relation to said rotatable member to define a material pulverizing zone therebetween for larger particles contained within extraneous material entering the guard.

8. The seal protection guard of claim 7 wherein said teeth combine to provide an interrupted outer frustoconical surface affording a plurality of material feeding ramps for directing extraneous material toward said material pulverizing zone.

9. The seal protection guard of claim 8 wherein said rotatable member has an annular recess in radially outwardly spaced relation to said hub, and said deflector shield has an outer edge spaced a greater distance axially outwardly from the annular body than said interrupted outer end face of said teeth for receipt within said recess of the rotatable member in further material shielding relation to said seal assembly.

* * * * *

UNITED STATES PATENT OFFICE
CERTIFICATE OF CORRECTION

PATENT NO. : 3,913,985
DATED : October 21, 1975
INVENTOR(S) : Robert S. Orr et al It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this

*third* Day of *February 1976*

[SEAL]

*Attest:*

RUTH C. MASON
*Attesting Officer*

C. MARSHALL DANN
*Commissioner of Patents and Trademarks*